United States Patent
Dary (10) Patent No.: US 11,429,935 B2
(45) Date of Patent: Aug. 30, 2022

(54) RETRIEVING HISTORICAL TAGS HIERARCHY PLUS RELATED OBJECTS

(71) Applicant: Red Hat Israel, Ltd., Raanana (IL)

(72) Inventor: Yaniv Dary, Kfar Saba (IL)

(73) Assignee: Red Hat Israel, Ltd., Raanana (IL)

( * ) Notice: Subject to any disclaimer, the term of this patent is extended or adjusted under 35 U.S.C. 154(b) by 1201 days.

(21) Appl. No.: 13/666,314

(22) Filed: Nov. 1, 2012

(65) Prior Publication Data

US 2014/0122430 A1    May 1, 2014

(51) Int. Cl.
   G06F 16/21    (2019.01)
   G06Q 10/00    (2012.01)
   G06Q 10/08    (2012.01)
   G06Q 10/06    (2012.01)

(52) U.S. Cl.
   CPC .......... *G06Q 10/20* (2013.01); *G06F 16/219* (2019.01); *G06Q 10/0639* (2013.01); *G06Q 10/087* (2013.01)

(58) Field of Classification Search
   CPC ......... G06F 17/30563; G06F 17/30274; G06F 11/1435; G06F 16/219; G06Q 10/20
   See application file for complete search history.

(56) References Cited

U.S. PATENT DOCUMENTS

| | | | | |
|---|---|---|---|---|
| 2007/0271242 A1* | 11/2007 | Lindblad | ................. | G06F 16/83 |
| 2009/0113350 A1* | 4/2009 | Hibino | .................... | G06F 16/41 715/853 |
| 2009/0164946 A1* | 6/2009 | Liddington | .................... | 715/853 |
| 2009/0248638 A1* | 10/2009 | Hughes | ............... | G06F 16/2477 |
| 2009/0271418 A1* | 10/2009 | Vaghani | .............. | G06F 11/1435 |
| 2012/0158725 A1* | 6/2012 | Molloy et al. | ................ | 707/737 |
| 2013/0036115 A1* | 2/2013 | Schwarz | ................ | G06Q 10/10 707/736 |

OTHER PUBLICATIONS

Heather Ackmann, 5 Examples of Microsoft Access Date Functions, Jun. 29, 2012, www.pluralsight.com/blog/it-ops/microsoft-access-date-functions (Year: 2012).*

Yang Song, Hierarchical Tag Visualization and Application for Tag Recommendations, Oct. 24, 2011, CIKM '11 (Year: 2011).*

* cited by examiner

*Primary Examiner* — Brittany N Allen (74) *Attorney, Agent, or Firm* — Lowenstein Sandler LLP (57) ABSTRACT

A method for historically synchronizing tag data related to a computer network is provided. A network management server compares a relations table of entities from a first database to a corresponding relations history table of entities from a second database. The network management server identifies from the comparison a pair of entities having a changed relationship. The network management server updates the relations history table of entities with the changed relationship in the second database. The network management server updates a path and level between a root of a tree of tags and each tag of the pair of tags in a historical configuration details table of tags in the second database based on updating the relations history table of entities.

20 Claims, 7 Drawing Sheets

RETRIEVING HISTORICAL TAGS HIERARCHY PLUS RELATED OBJECTS

TECHNICAL FIELD

Embodiments of the present invention relate to a computer network, and more specifically, to a method and system for managing and retrieving a historical tag hierarchy of a computer network.

BACKGROUND

Organizations currently use complex computer networks comprised of multiple resources, such as real and virtual machines and associated real and virtual hosts and peripheral devices, respectively. These virtual machines, hosts, and devices may be integrated into clusters and clusters further integrated into data centers. The data centers may be further integrated into a cloud. A system administrator that operates a network management system may have such duties as allocating system resources quickly and efficiently to keep such systems running smoothly. When a problem with one or more resources occurs, the network management system needs to quickly identify the problem resource(s), and allocate more or alternative resources.

A centralized data collection database may be employed by the network management system to track configuration data of computer system entities and statistical data associated with each of the computer system entities. Keeping track of a very large number of computer system entities, even when employing a centralized database, can become unruly and daunting.

One way system administrators have come to grips with tracking a large number of computer system entities is by means of assigning a tag to one or more entities. A tag is a non-hierarchical keyword or term assigned to a piece of information. The tag helps describe an item and allows it to be found again by browsing or searching. Tags are generally chosen informally and personally by the item's creator or by its viewer, depending on the system.

Unfortunately, the task of keeping track of a large number of tags may itself be a daunting task, fraught with error. Tags may be forgotten, unintentionally deleted, or unintentionally assigned to more than one entity.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for historically synchronizing tag data related to a computer network are described herein. A network management server compares a relations table of entities from a first database to a corresponding relations history table of entities from a second database. The network management server identifies from the comparison a pair of entities having a changed relationship. The network management server updates the relations history table of entities with the changed relationship in the second database. The network management server updates a path and level between a root of a tree of tags and each tag of the pair of tags in a historical configuration details table of tags in the second database based on updating the relations history table of entities. The entities may be computer system entities (e.g., virtual machines, hosts machines, clusters of hosts, data centers, etc.) or tags.

The tree of tags for a specified date based on paths and entities may be stored in a historical configuration details table of tags. A level for a tag in the tree and stored in a historical configuration details table of tags may be calculated based on a path length between the root and the tag in the tree. The path between the root and the tag in the tree may be a concatenation of strings of fixed length. A unique string may identify a path between two entities in the tree.

Updating the relations history table of entities with the changed relationship in the second database may comprise adding at least one row of an attachment of an entity or a detachment of an entity.

Updating the relations history table of entities with the changed relationship in the second database comprises performing at least one of an addition of an entity, an update of an entity, a deletion of an entity, or a move of an entity from one location to another location in the relations history table of entities. Updating the historical configuration details table of tags with the changed relationship in the second database comprises performing at least one of an addition of a tag, an update of a tag, a deletion of a tag, or a move of a tag from one location to another location in the historical configuration details table of tags.

In the historical configuration details table of tags, if a tag is to be updated, a new row is created with a new update date. If a tag is to be deleted, one or more new rows are created with a delete date for the tag and all children tags of the tag. If a tag is to be moved, one or more new rows are created with an update date for the tag and all children tags of the tag.

In the relations history table of entities, if an entity is to be deleted, one or more new rows are created with a detach date for the entity and all children entities of the entity. If an entity is to be moved, one or more new rows are created with a new attach date for the entity and the old connections of the entity are detached.

The constructing of the tree of tag for a specified date may be based on at least one of an attach date or a detach date in relations history table of entities and at least one of a create date, update date, or delete date in the historical configuration details table of tags.

The tree of tags is historical in the sense that certain fields in the historical configuration details table of tags may be employed to retrieve and present tags data on a display to the user (e.g., a network system administrator) to provide a snapshot of tags of entities in the system at a specific point in time. Embodiments of the present invention that manage and retrieve entities/tags from a historical database may derive trend data over time for one or more entities to identify and correct problems within the computer system before or when they occur. Employing the historical database in this manner can provide for offloading and re-allocating resources to considerably reduce congestion and thus processing time in a network management server and the computer system as a whole.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
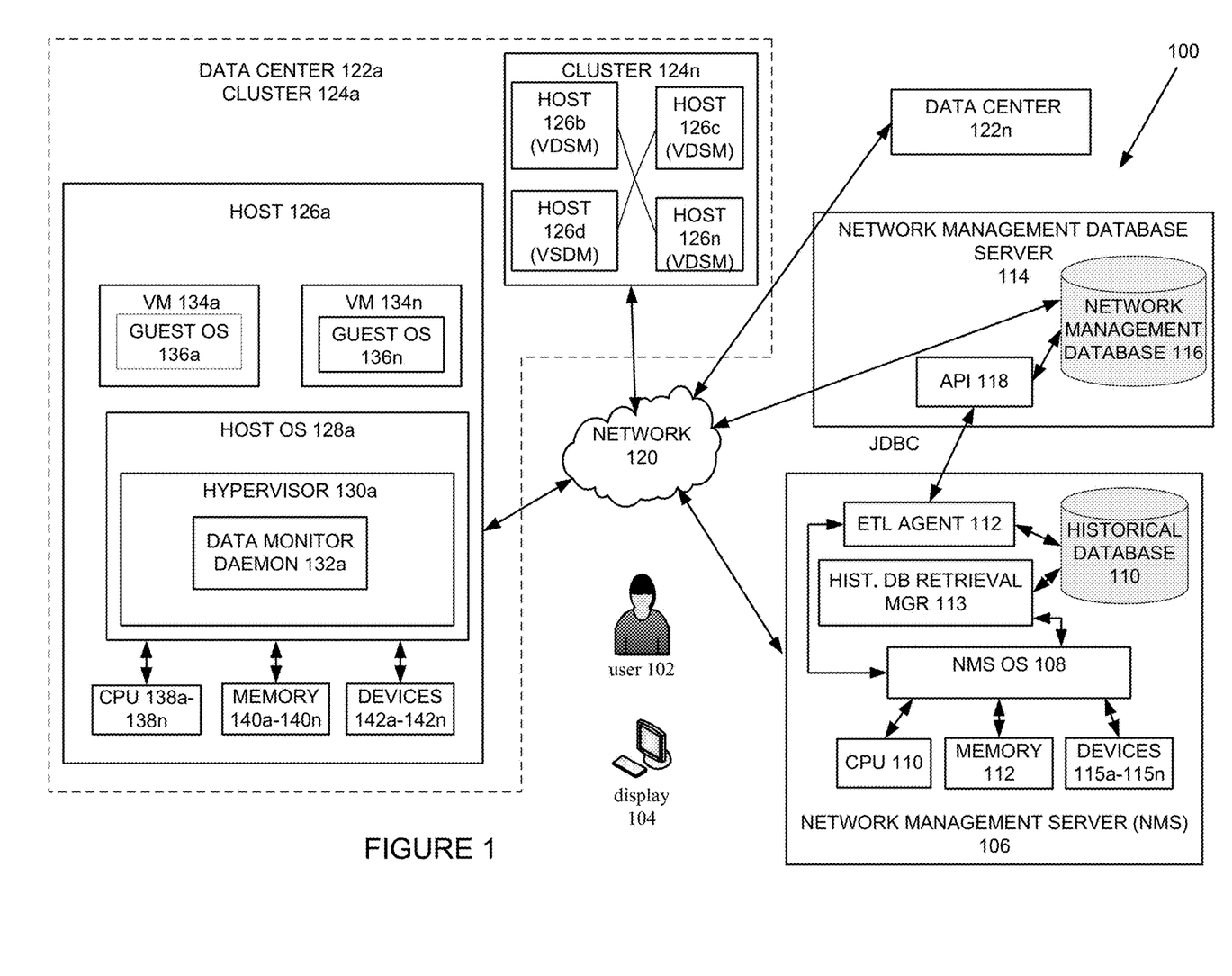
FIG. 1 is a block diagram of a network architecture in which embodiments of the present disclosure may operate.

FIG. 1 is a block diagram of a network architecture 100 in which embodiments of the present disclosure may operate. The network architecture 100 may represent a computer network that includes a network management server (NMS) 106 for monitoring one or more data centers 122a-122n. In one embodiment, the NMS 106 is configured to collect, store, and retrieve configuration and statistical data gathered from computer system entities comprising the one or more data centers 122a-122n in a network management database 116 controlled by a network management database server 114. In one embodiment, the NMS 106 is further configured to assign and retrieve tags to/from the computer system entities stored hierarchically but non-historically in a network management database 116 controlled by the network management database server 114 and to store the retrieved tags as a historical and hierarchical tree of tags in a historical database 110 controlled by the network management database server 114.

In one embodiment, the computer system entities comprising the one or more data centers 122a-122n may be one or more clusters 124a-124n of one or more host machines (also referred to as a host) 126a-126n. In one embodiment, the one or more hosts 126a-126n may each comprise one or more virtual machines 134a-134n. The servers 106, 114, the data centers 122a-122n, the clusters 124a-124n, and the hosts 126a-126n may be connected by a network 120. Each of the servers 106, 114 and the hosts 126a-126n may be a computing device such as, for example, desktop computers, personal computers (PCs), server computers, mobile phones, palm-sized computing devices, personal digital assistants (PDAs), tablet devices, etc. Each of the servers 106, 114 and the hosts 126a-126n may include one or more central processing units (CPUs) (e.g., 133a-138n, 110) respectively, configured to store and read data and programs from a corresponding memory (140a-140n, 112), respectively and control corresponding peripheral devices (e.g., 142a-142n).

In embodiments, the host 126a may be, for example, a server computer, a gateway computer or any other suitable computer system that is configurable for operating as a host. The host 126a may comprise an operating system 128a and a hardware platform. The host operating system 128a may include Microsoft Windows®, Linux®, Solaris®, Mac® OS or any other suitable operating system for managing operations on the host 126a.

The hardware platform may include one or more central processing units (CPUs) 138a, memory 140a, and peripheral devices 142a-142n. The devices 142a-142n may be comprised of one or more hardware and software devices, which may be located internally and externally to the host 126a. Examples of the devices 142a-142n may include network interface controllers, sound or video adaptors, photo/video cameras, printer devices, keyboards, displays or any other suitable device intended to be coupled to a computer system. Examples of the memory 140a may include random-access memory (RAM), non-volatile storage memory (e.g., Flash, EEPROM, solid state drives (SSD), etc.), magnetic storage memory (e.g., one or more hard drives), optical memory (e.g., CDs, DVD, BlueRay drives, etc.), etc.

The host 126a may be configured with one or more virtual machines (VMs) 134a-134n. A VM (e.g., 134a) is a portion of software that, when executed on appropriate hardware, creates an environment allowing the virtualization of an actual physical computer system. The VM 134a may function as a self-contained platform, comprising one or more virtual CPUs (not shown), virtual memory (not shown), and virtual devices (not shown) running under the control of a guest operating system 136a. The guest operating systems 136a may be the same or different operating system from the host operating system 128a. Similar to the host operating system 126a, the guest operating system 136a may include Microsoft Windows®, Linux®, Solaris®, Mac® OS or any other suitable operating system for managing operations associated with a virtualization environment.

The hypervisor 130a, which emulates the underlying hardware platform for the VMs 134a-134n, is provided and may run on the host OS 128a. A hypervisor is also known as a virtual machine monitor (VMM), a kernel-based hypervisor or a host operating system. The hypervisor 130a may support multiple VMs 134a-134n residing on the host 126a. Alternatively, more than one hypervisor 130a (not shown) may be provided to support multiple VMs 134a-134n residing on the host 126a. The hypervisor 130a is configured to emulate the one or more virtual CPUs, the virtual memory, and virtual peripheral devices in cooperation with the virtual device drivers (not shown) residing on a virtual machine (e.g., 134a).

In one embodiment, the hypervisor 130a may be configured to provide a data monitor daemon 132a comprising a plurality of threads/processes of execution (e.g., Java applets, not shown) for monitoring and collecting configuration data, statistical data, and tags data of computer system entities (e.g., CPU, memory, devices, OSs) associated with the host 126a and the VMs 134a-134n (including the host 126a and of the VMs 134a-134n, themselves. The data monitor daemon 132a is configured to sample configuration data, followed by statistical data, and then tags data associated with the computer system entities at periodic intervals (e.g., once per minute, per hour, per day, etc., depending on a type of computer system entity).

The network management database server 114 is configured to obtain the periodically sampled configuration data, statistical data, and tags data from the data monitor daemon (e.g., 132a) at the periodic intervals and store the collected data in a plurality of tables in a network management database 116. The tables in the network management database 116 are organized according to a hierarchy of computer system entities. The hierarchy of entities may be based on an ordering from higher complexity entities to lower complexity entities. The order may be, for example, by data center, clusters of hosts, hosts, devices associated with corresponding hosts, virtual machines associated with corresponding hosts, and virtual devices associated with corresponding virtual machines, etc. For each computer system entity, there is at least one table each for configuration data and statistical data. Every row in one of the tables corresponds to an individual polling of configuration or statistical parameters of a monitored entity for a specific collection time.

In one embodiment, queries submitted by the network management server (NMS) 106 for data may be directed to the network management database 116 under the control of the network management database server 114 using an application programming interface (API) 118. In one embodiment, queries to the network management database 116 may be in a form of structured query language (SQL). In one embodiment, a version of SQL employed may be Java database connectivity (JDBC).

In one embodiment, the network management server (NMS) 106 may be configured to communicate with the data centers 122a-122n, the clusters 124a-124n, and the hosts 126a-126n over the network 120. In embodiments, the network management server (NMS) 106 may be configured to communicate with the network management database server 114 through the API 118 using JDBC either indirectly over the network 432, directly over a wired or wireless LAN or WAN, or may be integrated with the network management data server 114. The NMS 106 may include a computing machine such as, for example, a server computer, a gateway computer, or any other suitable computer system that is configurable for operating as an NMS 106. The NMS 106 comprises an NMS operating system (OS) 108 and a hardware platform. The NMS operating system 108 may include Microsoft Windows®, Linux®, Solaris®, Mac® OS or any other suitable operating system for managing operations on the NMS 106.

The hardware platform may include one or more central processing units (CPUs) 110, memory 112, and devices 115a-115n. The devices 115a-115n may be comprised of one or more hardware and software devices, which may be located internally and externally to the NMS 106. An example of the devices (e.g., 115a) may include a network interface controller (NIC) such as an Ethernet network card for communication over the network 120. The network 120 may be a private network (e.g., a local area network (LAN), wide area network (WAN), intranet, etc.) or a public network (e.g., the Internet).

Other examples of the devices 115a-115n may include sound or video adaptors, photo/video cameras, printer devices, keyboards, displays, or any other suitable device intended to be coupled to a computer system. Examples of the memory 112 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, the NMS 106 is configured to monitor and collect configuration and statistical data associated with the computer system entities (e.g., the data centers 122a-122n, the clusters 124a-124n, the hosts 126a-126n, and the VMs 134a-134n) from the network management database 116 via an extract, transform, and load (ETL) agent 112. As used herein, extract, transform, and load (ETL) refers to a process that involves extracting data from outside sources (e.g., the network management database 116), transforming the data to fit operational needs (e.g., identify historical trends of the state of computer system entities), and loading the transformed data into an end target (i.e., the historical database 110).

In one embodiment, the NMS 106 is further configured to historically synchronize tag data related to entities in the system 100. An entity, as used herein, corresponds to a computer system entity or a tag. A tag, as used herein, may be associated with one or more computer system entities, a group of computer system entities, a user (e.g., the user 102), a group of users, another tag, or a group of other tags).

In an embodiment, the ETL agent 112 is configured to collect the non-historically organized tag data associated with entities from the network management database 116 whenever a state (i.e., addition of a tag, updating of a tag, deletion of a tag, or movement of a tag from one location to another location in a configuration tree) of one or more of the entities changes (i.e., not for every sampling of data as in the case of the data monitor daemons 132a-132n). The ETL agent 112 is further configured to identify the one or more computer system entities that have changes state, to assign a unique history identifier (e.g., version number that increases with each change of state of an entity) to an identifier field in a corresponding configuration table and statistical table collected from the network management database 116, and to update a corresponding configuration table and statistical table in a historical database 110.

In an embodiment, the ETL agent 112 is further configured to collect non-historically organized tree of tag configurations and relationships between tags and/or computer system entities from the network management database 116 and store them in the same hierarchy historically in the historical database 110 whenever a state of an entity changes (i.e., addition, deletion, or movement of an entity/tag from one location in a configuration tree to another location in the configuration tree). The database 110 is historical in the sense that certain fields in tables described in FIG. 2 may be employed by a history database retrieval manager 113 to retrieve and present tags data on a display 104 to the user 102 (e.g., a network system administrator) to provide a snapshot of tags of entities in the system 100 at a specific point in time.

Figure 2:
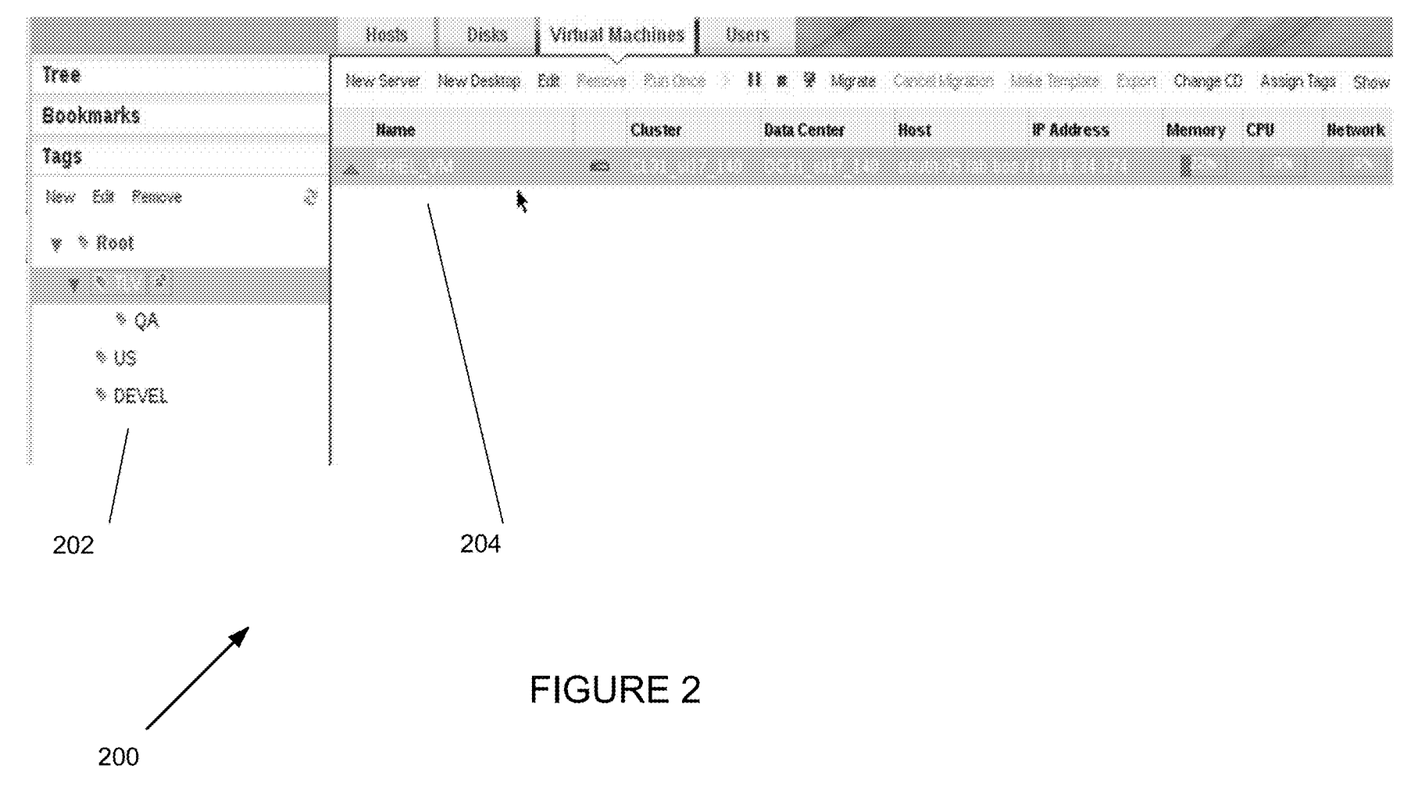
FIG. 2 shows a view of a display employed by a user (e.g., a system administrator) for viewing a tag tree and associated computer system entities.

FIG. 2 shows a view 200 of a display 104 employed by a user 102 (e.g., a system administrator) for viewing a tag tree 200 and associated computer system entities 204. In addition to viewing the current tag tree 202, the user 102 may edit the tree over time. For example, the user may add, delete, move, and/or update entities, including tags in the tree 202. The changes to the tree 202 may be tracked over time by the ETL agent 112 of the network management server 106 to permit the user 102 to retrieve the tree as it appeared at any point in time from the initial creation of a first tag in the tree 202 up to and including the current moment. In an embodiment, the network management server 106 maintains and modifies two historical tables associated with the entities in the tree 202, 204 as illustrated in FIG. 3.

Figure 3:
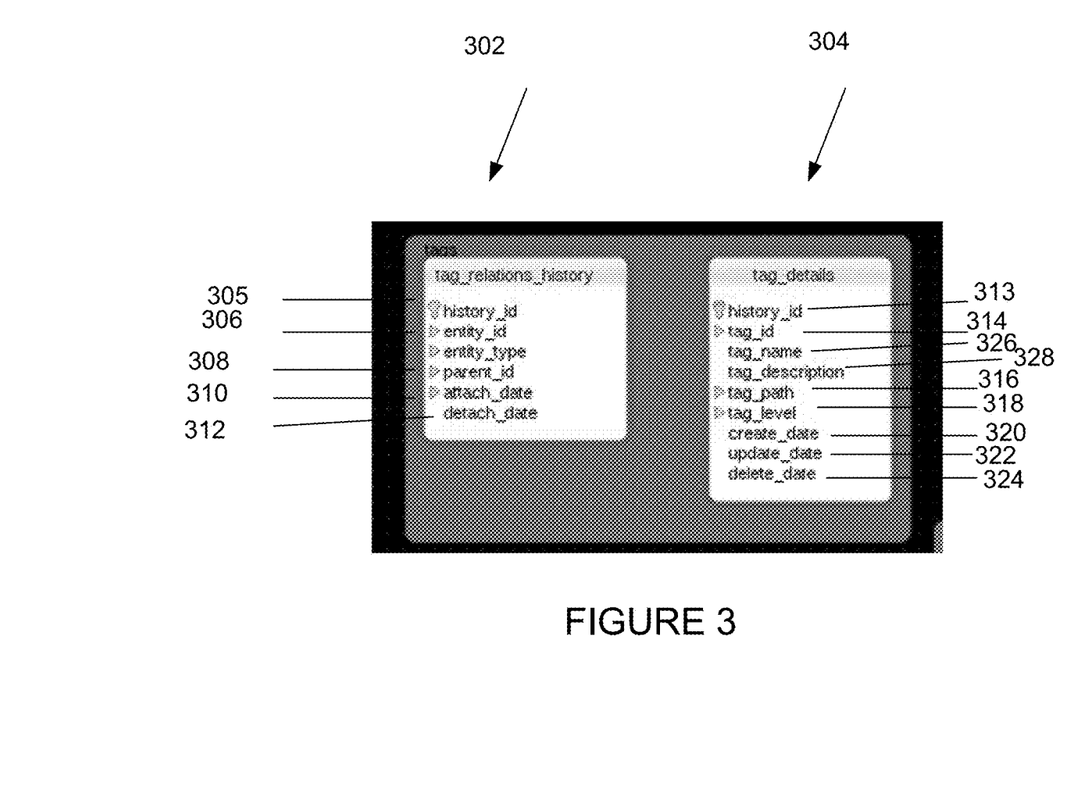
FIG. 3 shows data structures comprising a relations history table of entities and an associated configuration details table of tags.

FIG. 3 shows data structures comprising a relations history table of entities 302 ("tag_relations_history") and an associated historical configuration details table of tags 304 ("tags_details"). The relations history table of entities 302 includes fields for a history identifier 305 indicating a sequence of events in the tree 202, an entity identifier 306 ("entity_id") identifying a node corresponding to an entity stored in a historical entity tree 202 that may be a tag, a virtual machine, a host, a user, etc., an entity parent identifier 308 ("parent_id") identifying a parent node corresponding to a parent entity of an entity stored at a next higher level in the tree 202, an attach date 310 for storing a time when the entity was added to the tree 202, and a detach date 312 for storing a time when the entity is either moved or deleted from the parent node in the tree 202.

The historical configuration details table of tags 304 includes fields for a history identifier 313 corresponding to the history identifier 305, a tag identifier 314 ("tag_id") which is related to or associated with the entity identifier 306 in the relations history table 302, a tag path field 316 that stores a string comprising segments of strings of a specified length (see FIG. 5) that is employed to indicate segments of a complete path from a root node of the tree 202 to a specific tag and from the specific tag to other entities, a tag level field 318 indicating the level in the tree 202 at which an entity is stored. The level is proportional to the number of fixed string length segments comprising the string stored in the tag path field 316. The historical configuration details table of tags 304 further includes fields for a create date 320 for storing a time when a tag was first created and added to the tree 202, an update date 322 for storing a time when the tag was modified in any manner (e.g., a change of name), and a delete date 312 for storing a time when the tag is either moved or deleted from a parent node in the tree 202. The configuration details table 304 also includes fields for a mnemonic tag name field 326 for storing a name of a tag that is easily remembered by the user 102 and a tag description field 328 for storing additional information associated with the tag in a row.

Subsequent to the specified time intervals at which the ETL agent 112 checks for changes to computer system entities, the ETL agent 112 further checks for any tag-related entity changes in the network management database 116 (e.g., additions, deletions, movements, and updates of entities/tags) and updates the relations history table of tags 302 and the associated historical configuration details table of tags 304 in the historical database 110. Instead of performing direct deletions or movements of entities in the tables 302, 304, which may result in a loss of historical data in which an entity that was deleted cannot be found in a search at a later date, the ETL agent 112 updates changes by adding new rows to the tables 302, 304 with changes indicated in the fields 306-328 and leaving the original rows intact (See FIG. 5).

Figure 4:
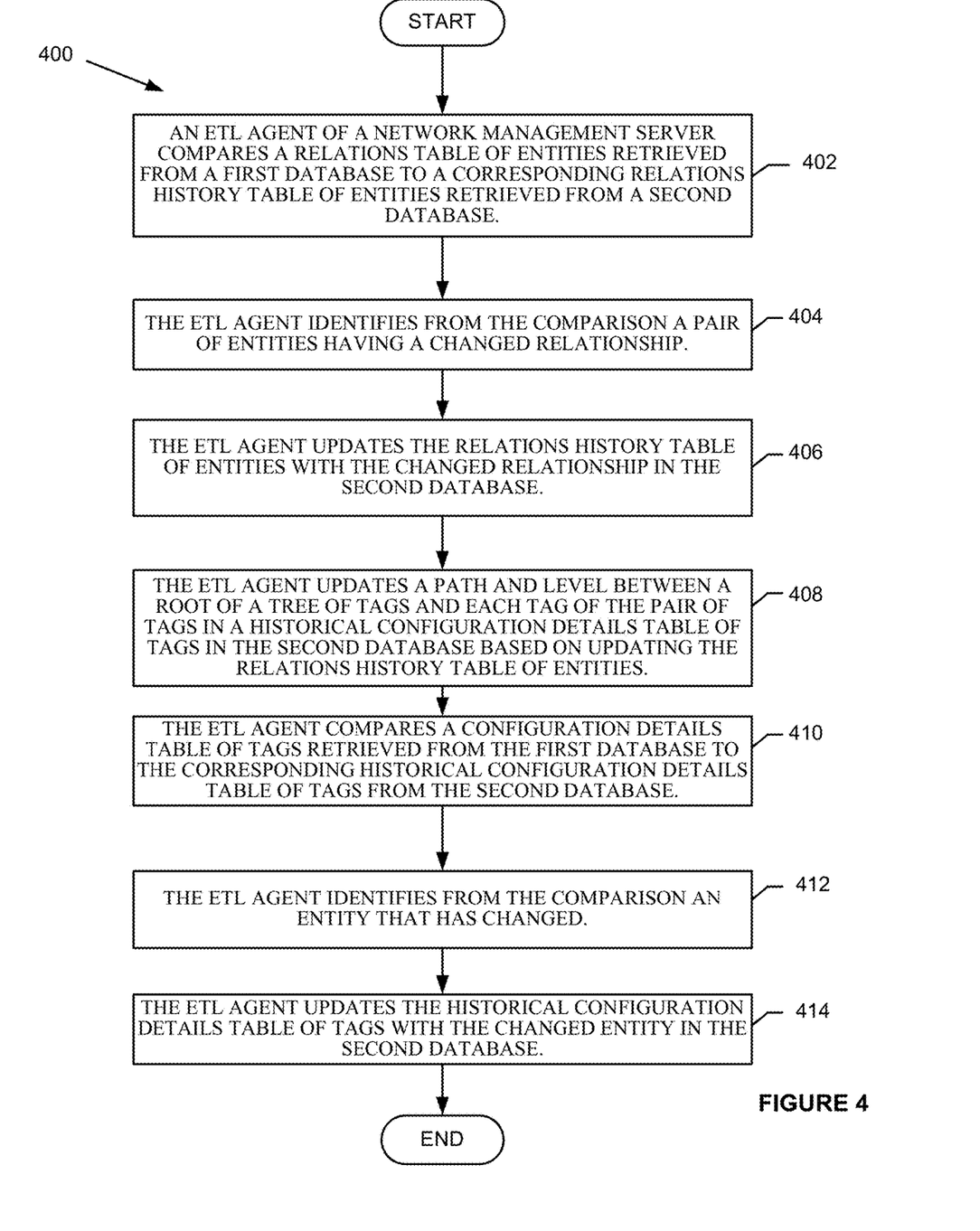
FIG. 4 is a flow diagram illustrating of one embodiment of a method for historically synchronizing tag data related to a computer network.

FIG. 4 is a flow diagram illustrating of one embodiment of a method 400 for historically synchronizing tag data related to a computer network 100. Method 400 may be performed by processing logic (e.g., in computer system 700 of FIG. 7) that may comprise hardware (e.g., circuitry, dedicated logic, programmable logic, microcode, etc.), software (such as instructions run on a processing device), firmware, or a combination thereof. In one embodiment, method 400 is performed by the ETL agent 112 of the network management server (NMS) 106 of FIG. 1.

In one embodiment, method 400 begins when, at block 402, the ETL agent 112 compares a relations table of entities from a first database (e.g., the network management database 116) to a corresponding relations history table of entities (e.g., the relations history table of entities 302) from a second database (e.g., the historical database 110). At block 404, the ETL agent 112 identifies from the comparison a pair of entities having a changed relationship. At block 406, the ETL agent 112 updates the relations history table of entities 302 with the changed relationship in the second database. At block 408, the ETL agent 112 updates a path between a root of a tree of tags and each tag of the pair of tags in a historical configuration details table of tags (e.g., the configuration details table of tags 304) in the second database based on updating the relations history table of entities 302.

At block 410, the ETL agent 112 compares a configuration details table of tags retrieved from the first database (e.g., the network management database 116) to a corresponding configuration historical configuration details table of tags (e.g., the historical configuration details table of tags 304) retrieved from the second database (e.g., the historical database 110). At block 412, the ETL agent 112 identifies from the comparison a tag that has changed. At block 414, the ETL agent 112 updates the historical configuration details table of tags 304 with the changed entity in the second database.

Figure 5:
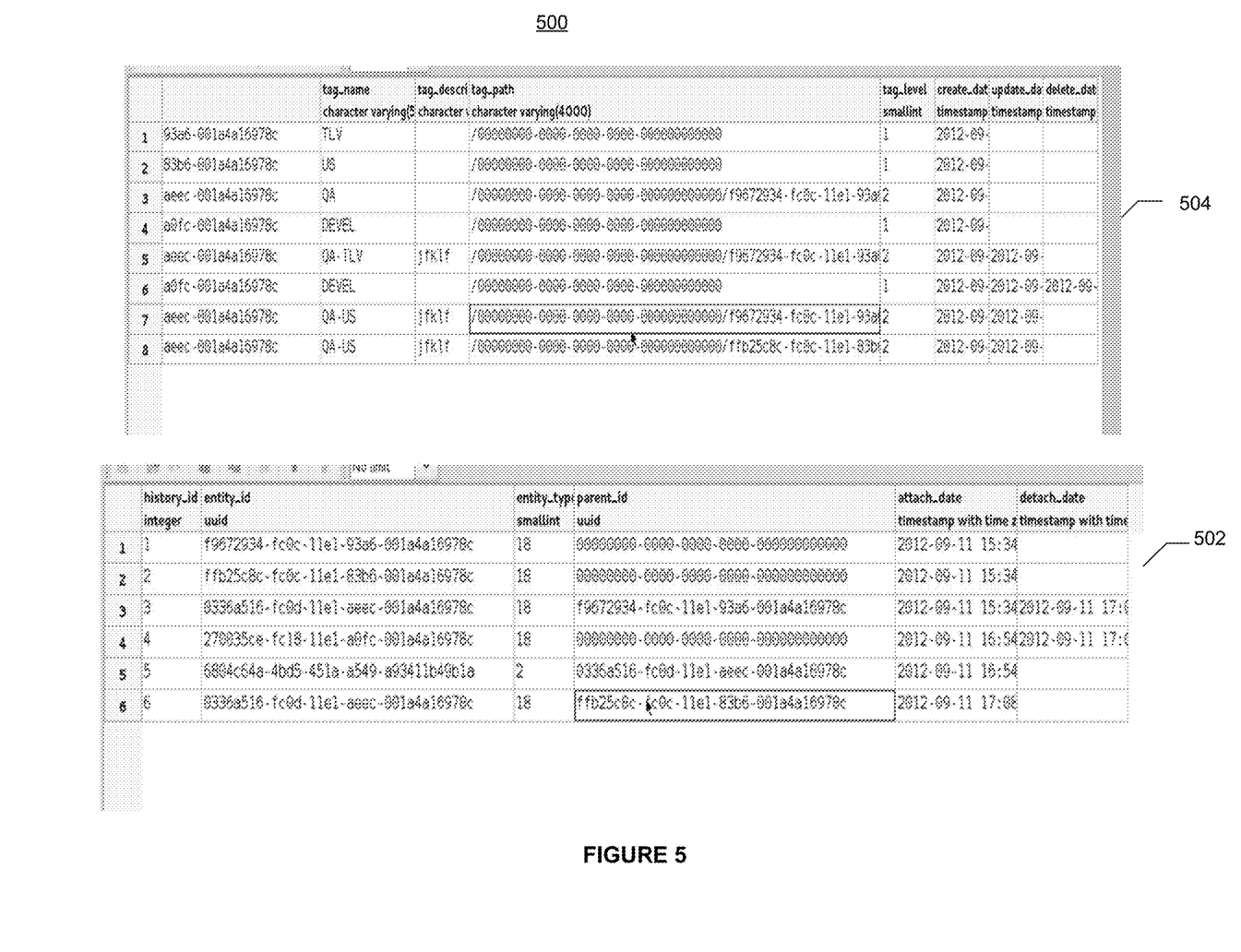
FIG. 5 depicts an example of an updated relations history table and a corresponding configuration details table having a plurality of entries indicating additions, deletions, moves, and updates.

FIG. 5 depicts an example 500 of an updated relations history table of entities 502 and a corresponding updated historical configuration details table of tags 504 having a plurality of entries indicating additions, deletions, moves, and updates. Updating the relations history table of entities 502 with the changed relationship in the historical database 110 may comprise performing one or more additions of an entity, deletions of an entity, updating of an entity, or a move of an entity from one location to another location in the relations history table of entities 502. Similarly, updating the historical configuration details table of tags 504 with a changed tag in the historical database 110 may comprise performing one or more additions of a tag, logical deletions of a tag, logical updating of a tag, or a logical move of a tag from one location to another location in appropriate data fields of the configuration historical details table 504.

To add an entity (e.g., a tag "QA" which is a child node of a tag "TLV" (and all other entities that are children of "QA" or "VM")) in the relations history table 502, a row is added to the relations history table of entities 502. The row may be populated with an entity identifier (e.g., a universal unique identifier integer or UUID), an entity parent identifier (e.g., a UUID corresponding to the tag "TLV"), and attach date for an entity ("QA") to be added. These changes are performed recursively for all entities that are children of "QA."

To delete an entity (e.g., the tag "QA" removed as a child node of a tag "TLV" (and all other entities that are children of "QA" or "VM")) in the relations history table 502, a row in the relations history table of entities 502 corresponding to an entity parent identifier (e.g., "TLV") of the entity to be deleted (e.g., "QA") is identified. A new row is added to the relations history table of entities 502 corresponding to the entity parent identifier (e.g. "TLV") of the entity to be deleted (e.g., "QA"). Fields from in the identified row are copied to corresponding fields in the new row. Then, a detach date corresponding to the entity to be deleted is set in the new row. These changes are performed recursively for all entities that are children of "QA."

Moving an entity (e.g. "QA-US") from one location (e.g., under "TLV") to another location (e.g., under "US") (and all other entities that are children of "QA-US" or "VM") in the relations history table of entities 502 comprises an update of the entity "QA-US" from the location (e.g., under "TLV") and an addition of the entity "QA-US" to another location (e.g., under "US"). The deletion of the entity "QA-US" (and all other entities that are children of "QA-US" or "VM") from the location "TLV" is modified in the sense that a parent identifier field is set to a parent identifier to which to attach the entity to be moved. The addition of the entity "QA-US" to the location "US" is modified in the sense that the old connection is detached (i.e., the detach field is filled) from the parent identifier field from which "QA-US" was moved. Moving the entity "QA-US" (and all other tags or entities under it or VM) from the location "TLV" to the location "US" is recursive in the sense that a new connection is added to the entity "US" to which "QA-US" is to be moved.

To add a tag (e.g., a tag "QA" which is a child node of a tag "TLV") in the configuration historical details table of tags 504, a row is added to the historical configuration details table of tags 504. The row may be populated with an entity identifier, a tag path (e.g., "TLV") to be added (which is calculated based on values in the relations history table of entities 502), a tag level (e.g., "level 2") one greater than the parent entity (e.g., "level 1") (which is calculated based on the tag path), and a create date for the entity to be added.

To update a tag (e.g., change the tag "QA-TLV" to "QA-US") in the historical configuration details table of tags 504, a row is inserted with the updated configuration data and an update date.

To delete a tag (e.g., the tag "QA" removed as a child node of a tag "TLV") in the historical configuration details table of tags 504, a row in the historical configuration details table of tags 504 corresponding to the entity to be deleted is identified. A new row is added to the historical configuration details table of tags 504 corresponding to the entity to be deleted. Fields from in the identified row are copied to corresponding fields in the new row.

Moving a tag (e.g. "QA-US") from one location (e.g., under "TLV") to another location (e.g., under "US") in the historical configuration details table of tags 504 comprises a recursive, modified version of an update of the tag (e.g. "QA-US") (and all of the tags that are children of "QA-US") from the location (e.g., under "TLV") and an addition of the tag (e.g. "QA-US") to another location (e.g., under "US"). The addition of the tag ("QA-US") to the location (e.g., under "US") is modified in the sense that a new row is added with a new update date with a tag path that is set to a segment corresponding to the tag to be moved ("QA-US") appended to a segment corresponding to a parent tag (e.g., "US") to which to attach the tag to be moved ("QA-US"). These modifications are performed for all of the tags that are children of "QA-US". The deletion of the entity ("QA-US") from the location (e.g., under "TLV") is modified in the sense "QA-US" is replaced by the updated rows. Moving the "QA-US" from the location "TLV" to the location "US" is recursive in the sense that the update may be performed for child tags of the tag to be moved as would be the case of moving a sub-tree from one location in a larger tree to another location in the larger tree.

Figure 6:
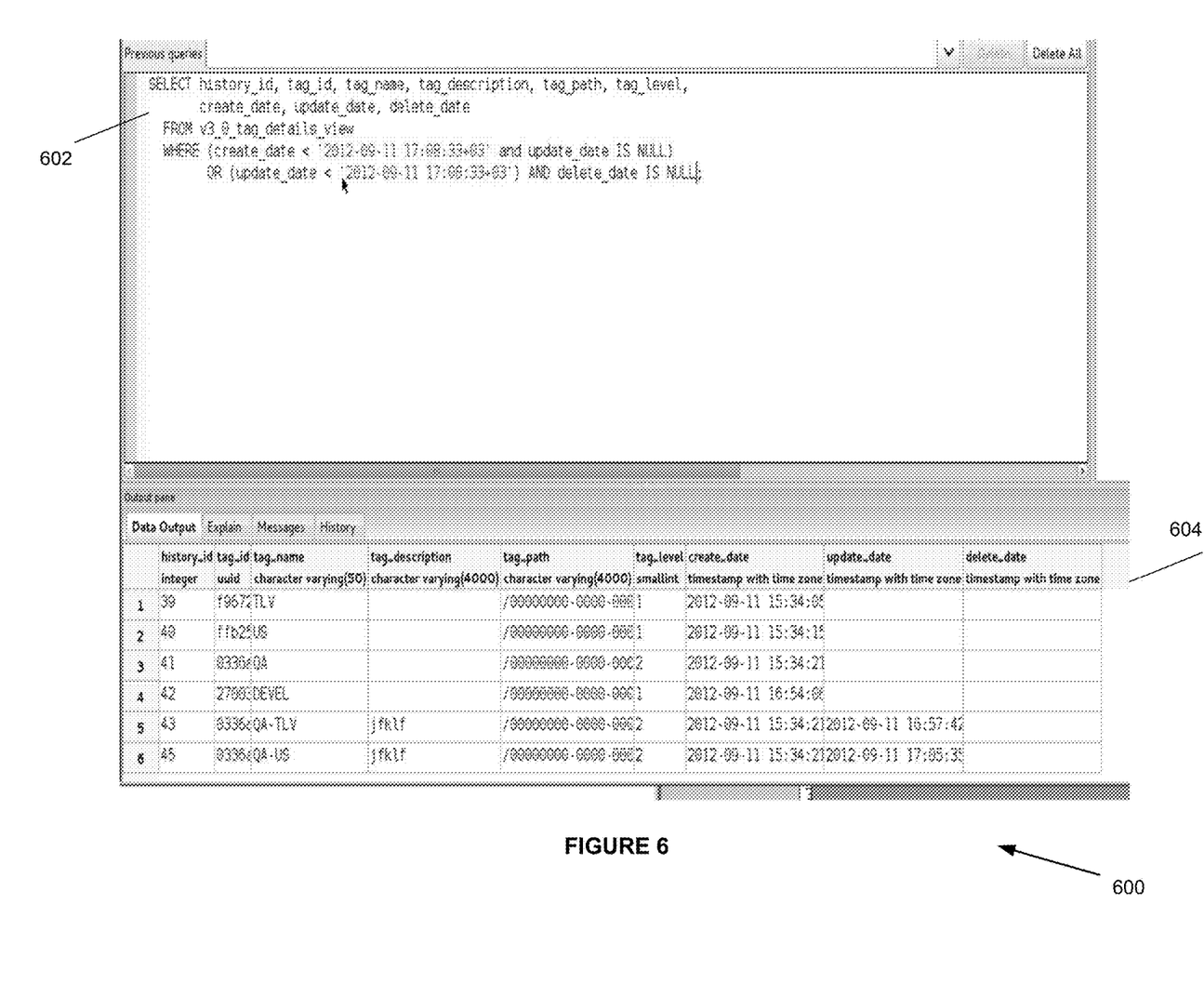
FIG. 6 illustrates an example of results of a retrieval to obtain the historical state of a tree of tags displayed on a display to a user according to a time range.

FIG. 6 illustrates an example of results of a retrieval 600 to obtain the historical state of a tree of tags displayed on a display 104 to a user 102 according to a time range. The retrieval 600 may be performed by processing logic (e.g., in computer system 700 of FIG. 7) that may comprise hardware (e.g., circuitry, dedicated logic, programmable logic, microcode, etc.), software (such as instructions run on a processing device), firmware, or a combination thereof. In one embodiment, the retrieval 600 is performed by the historical database retrieval manager 113 of the network management server (NMS) 106 of FIG. 1.

In the example 600, the user 102 enters an SQL-like query 602, in response to which the historical database retrieval manager 113 retrieves the results 604 from the historical database 110 for display on the display 104 formatted according to the historical configuration details table of tags 504. The query may be based on a specified date range (e.g., from the start of the tree of entities to the current time, i.e., the current state of the tree; from a prior time to the present; or an intermediate time in the past to a later time in the past (this is useful for retrieving entities that no longer exist).

The tree of tags for a specified date may be based on at least one of an attach date or a detach date in relations history table of entities 502 and at least one of a create date, update date, or delete date in the historical configuration details table of tags 504. For retrievals and filtering of historical data, the historical database retrieval manager 113 of the network management server 106 may construct a tree of tags for a specified date based on paths and tags stored in the historical configuration details table of tags 504. The historical database retrieval manager 113 may calculate a level for an entity in the tree and stored in the relations history table of entities 502 based on a path length between the root and the entity in the tree. The path between the root and the entity in the tree is a concatenation of strings of fixed length. The unique string identifies a path between two entities in the tree.

Figure 7:
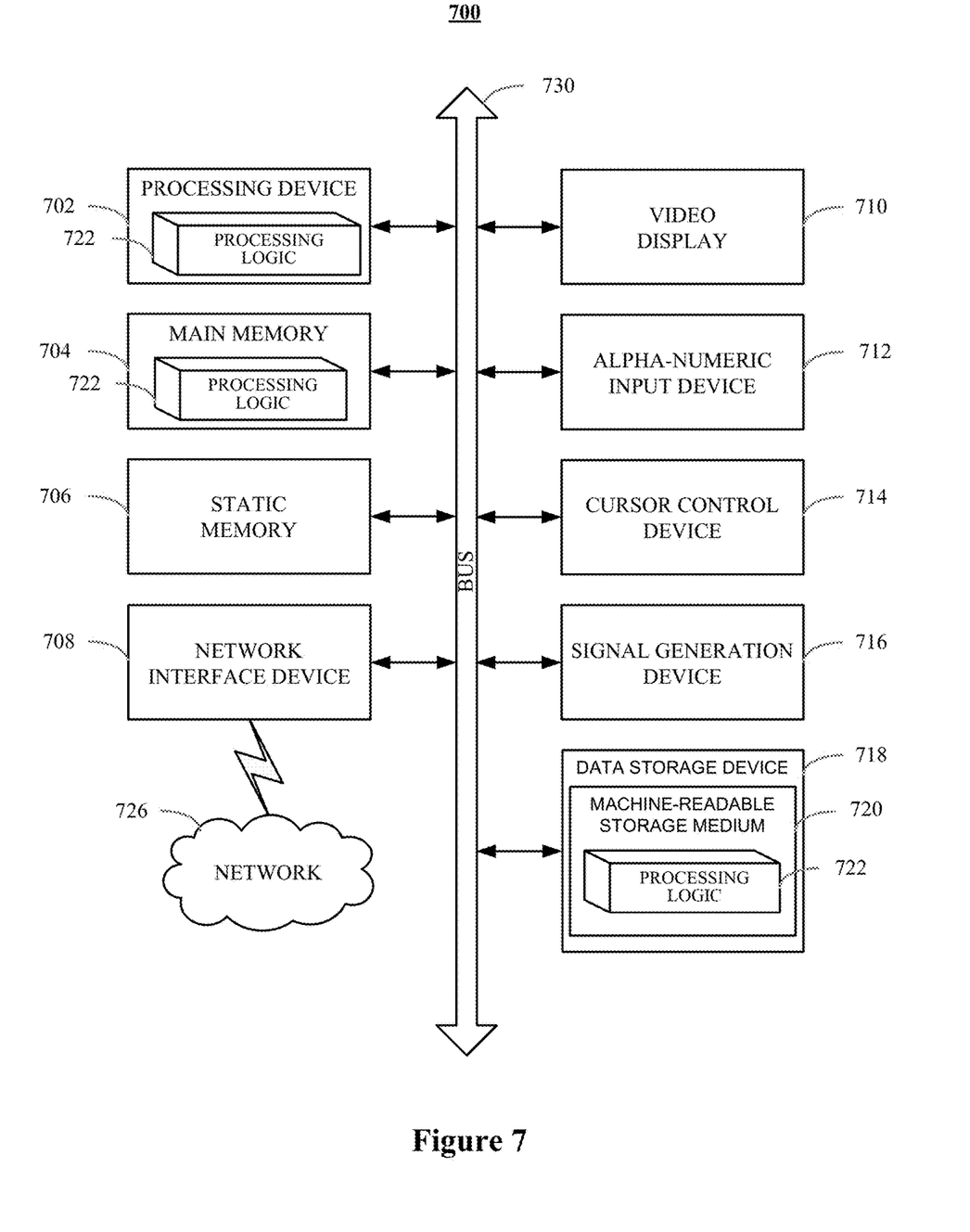
FIG. 7 illustrates a diagrammatic representation of a machine in the exemplary form of a computer system within which a set of instructions, for causing the machine to perform any one or more of the methodologies discussed herein, may be executed.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute processing logic 522 for implementing at least one of the ETL agent 112 or the historical database retrieval manager 113 for performing the operations and steps discussed herein.

Computer system 700 may further include a network interface device 708. Computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Data storage device 718 may include a machine-readable storage medium (or more specifically a computer-readable storage medium) 720 having one or more sets of instructions (i.e., processing logic 522) embodying any one or more of the methodologies of functions described herein. The processing logic 722 may also reside, completely or at least partially, within main memory 704 and/or within processing device 702 during execution thereof by computer system 700; main memory 704 and processing device 702 also constituting machine-readable storage media. The processing logic may further be transmitted or received over a network 726 via network interface device 708.

Machine-readable storage medium 720 may also be used to store the device queue manager logic persistently. While machine-readable storage medium 720 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
comparing, by a processing device, a relations table of entities from a first database to a corresponding relations history table of entities from a second database, wherein each entity in the relations history table of entities has a corresponding tag;
identifying, from the comparison, a pair of entities having a changed relationship;
updating the relations history table of entities in the second database with the changed relationship of the identified pair of entities;
updating a path between a root of a tree of tags and the corresponding tags of the pair of entities in a historical configuration details table of tags in the second database in view of updating the relations history table of entities, wherein the path is represented as a concatenation of segments of strings of a fixed length;
after updating the path, identifying a changed tag based on a comparison of a configuration details table of tags in the first database to the historical configuration details table of tags in the second database;

updating the historical configuration details table of tags in the second database with the changed tag to obtain an updated historical configuration details table of tags by performing, on a respective tag, at least one of a tag addition, a tag deletion, or a tag move from one location to another location, wherein the updated historical configuration details table of tags indicates the tag addition, the tag deletion, or the tag move;

receiving a request for a state of the tree of tags for a range of dates;

identifying, by the processing device, path and tag information associated with the tree of tags for each date of the range of dates in view of:

at least one of an attach date or detach date in the relations history table of entities, and at least one of a create date, update date or delete date stored in the historical configuration details table;

calculating, by the processing device, a level for each entity in the tree of tags in view of a path length between the root and the entity, wherein the level is proportional to a number of segments of strings of the fixed length representing the path in the historical configurations details table; and constructing, by the processing device, the tree of tags for each date of the range of dates in view of the calculated level for each entity in the tree of tags and the identified path and tag information associated with the tree of tags.

2. The method of claim 1, further comprising updating a path and level for each child tag of the pair of entities.

3. The method of claim 1, wherein a unique string identifies a path between two tags in the tree of tags.

4. The method of claim 1, wherein an entity corresponds to a computer system entity.

5. The method of claim 1, wherein the tags stored in the historical configuration details table are associated with at least one of a computer system entity, a group of computer system entities, a user, a group of users, another tag, or a groups of other tags.

6. The method of claim 1, wherein updating the relations history table of entities comprises adding at least one row of an attachment of a respective entity or a detachment of the respective entity.

7. The method of claim 1, wherein updating the relations history table of entities with the changed relationship in the second database comprises at least one of an addition of a respective entity in the relations history table of entities, a logical deletion of the respective entity in the relations history table of entities, or a logical move of the respective entity from one location to another location in the relations history table of entities.

8. The method of claim 7, wherein the addition of the respective entity in the relations history table of entities comprises: adding a row to the relations history table of entities; and populating the added row with an entity identifier, an entity parent identifier, and attach date for the respective entity to be added.

9. The method of claim 7, wherein the logical deletion of the respective entity in the relations history table of entities comprises:

identifying a row in the relations history table of entities corresponding to an entity parent identifier of the respective entity to be deleted;

adding a new row to the relations history table of entities corresponding to the entity parent identifier of the respective entity to be deleted; copying fields in the identified row to corresponding fields in the new row; and setting a detach date corresponding to the respective entity to be deleted in the new row.

10. The method of claim 7, wherein the logical move of the respective entity from one location to another location in the relations history table of entities comprises:

identifying a row in the relations history table of entities corresponding to an entity parent identifier of the respective entity to be moved;

adding a new row to the relations history table of entities corresponding to the entity parent identifier of the respective entity to be moved;

copying fields in the identified row to corresponding fields in the new row; and setting an attach date corresponding to the respective entity to be moved in the new row and setting a detach date corresponding to the respective entity to be moved in the identified row.

11. The method of claim 1, wherein updating the historical configuration details table of tags with the changed tag further comprises:

adding at least one row of an attachment of the respective tag or a detachment of the respective tag to the historical configuration details table of tags; and updating the historical configuration details table of tags with the changed tag in the second database with new data and an update date.

12. The method of claim 11, wherein updating the historical configuration details table of tags with the changed tag in the second database comprises at least one of an addition of the respective tag in the historical configuration details table of tags, a deletion of the respective tag in the historical configuration details table of tags, or a move of the respective tag from one location to another location in the historical configuration details table of tags.

13. The method of claim 12, wherein the addition of the respective tag in the historical configuration details table of tags comprises:

adding a row to the historical configuration details table of tags; and populating the added row with a tag identifier, a tag path comprising a first segment corresponding to the respective tag to be added appended to a second segment corresponding to a parent of the respective tag to be added, a tag level one greater than the parent, and a create date for the respective tag to be added.

14. The method of claim 12, wherein the deletion of the respective tag in the historical configuration details table of tags comprises:

identifying a row in the historical configuration details table of tags corresponding to the respective tag to be deleted;

adding a new row to the historical configuration details table of tags corresponding to the respective tag to be deleted;

copying fields in the identified row to corresponding fields in the new row; and removing a first segment of a tag path corresponding to the respective tag to be deleted in the new row while leaving a second segment of the tag path corresponding to a parent of the respective tag intact; and setting a delete date corresponding to the respective tag to be deleted in the new row.

15. The method of claim 12, wherein the tag move of the respective tag from one location to another location in the historical configuration details table of tags comprises:
- an addition of an update row of a tag corresponding to the respective tag to be moved in the historical configuration details table of tags, wherein a tag path is set to a first segment corresponding to the respective tag to be moved appended to a second segment corresponding to a parent to which to attach the respective tag to be moved; and
- repeating the addition and the deletion for each child tag of the respective tag to be moved.

16. A computer system, comprising:
a memory;
a processing device operatively coupled to the memory to:
- compare a relations table of entities from a first database to a corresponding relations history table of entities from a second database, wherein each entity in the relations history table of entities has a corresponding tag;
- identify from the comparison a pair of entities having a changed relationship;
- update the relations history table of entities in the second database with the changed relationship of the identified pair of entities;
- update a path between a root of a tree of tags and the corresponding tags of the pair of entities in a historical configuration details table of tags in the second database in view of the update of the relations history table of entities, wherein the path is represented as a concatenation of segments of strings of a fixed length;
- after the updating of the path, identify a changed tag based on a comparison of a configuration details table of tags in the first database to the historical configuration details table of tags in the second database;
- update the historical configuration details table of tags in the second database with the changed tag to obtain an updated historical configuration details table of tags by performing, on a respective tag, at least one of a tag addition, a tag deletion, or a tag move from one location to another location, wherein the updated historical configuration details table of tags indicates the tag addition, the tag deletion, or the tag move;
- receive a request for a state of the tree of tags for a range of dates;
- identify path and tag information associated with the tree of tags for each date of the range of dates in view of:
  - at least one of an attach date or detach date in the relations history table of entities, and
  - at least one of a create date, update date or delete date stored in the historical configuration details table;
- calculate a level for each entity in the tree of tags in view of a path length between the root and the entity, wherein the level is proportional to a number of segments of strings of the fixed length representing the path in the historical configurations details table; and
- construct the tree of tags for each date of the range of dates in view of the calculated level for each entity in the tree of tags and the identified path and tag information associated with the tree of tags.

17. A non-transitory computer-readable storage medium comprising instructions that, when executed by a processing device, cause the processing device to:
- compare a relations table of entities from a first database to a corresponding relations history table of entities from a second database, wherein each entity in the relations history table of entities has a corresponding tag;
- identify from the comparison a pair of entities having a changed relationship;
- update the relations history table of entities in the second database with the changed relationship of the identified pair of entities;
- update a path between a root of a tree of tags and the corresponding tags of the pair of entities in a historical configuration details table of tags in the second database in view of the update of the relations history table of entities, wherein the path is represented as a concatenation of segments of strings of a fixed length;
- after the updating of the path, identify a changed tag based on a comparison of a configuration details table of tags in the first database to the historical configuration details table of tags in the second database;
- update the historical configuration details table of tags in the second database with the changed tag to obtain an updated historical configuration details table of tags by performing, on a respective tag, at least one of a tag addition, a tag deletion, or a tag move from one location to another location, wherein the updated historical configuration details table of tags indicates the tag addition, the tag deletion, or the tag move;
- receive a request for a state of the tree of tags for a range of dates;
- identify path and tag information associated with the tree of tags for each date of the range of dates in view of:
  - at least one of an attach date or detach date in the relations history table of entities, and
  - at least one of a create date, update date or delete date stored in the historical configuration details table;
- calculate a level for each entity in the tree of tags in view of a path length between the root and the entity, wherein the level is proportional to a number of segments of strings of the fixed length representing the path in the historical configurations details table; and
- construct the tree of tags for each date of the range of dates in view of the calculated level for each entity in the tree of tags and the identified path and tag information associated with the tree of tags.

18. The computer system of claim 16, wherein, in updating the historical configuration details table of tags with the changed tag, the processing device is further to:
- add at least one row of an attachment of the respective tag or a detachment of the respective tag to the historical configuration details table of tags; and
- update the historical configuration details table of tags with the changed tag in the second database with new data and an update date.

19. The computer system of claim 16, wherein updating the relations history table of entities with the changed relationship in the second database comprises at least one of an addition of a respective entity in the relations history table of entities, a logical deletion of the respective entity in the relations history table of entities, or a logical move of the respective entity from one location to another location in the relations history table of entities.

20. The non-transitory computer-readable storage medium of claim 17, wherein updating the relations history table of entities comprises adding at least one row of an attachment of a respective entity or a detachment of the respective entity.

* * * * *